US010169877B2

(12) United States Patent
Palaniyappan et al.

(10) Patent No.: US 10,169,877 B2
(45) Date of Patent: Jan. 1, 2019

(54) METHODS AND SYSTEMS FOR SEGMENTING MULTIPLE DOCUMENTS FROM A SINGLE INPUT IMAGE

(71) Applicant: XEROX CORPORATION, Norwalk, CT (US)

(72) Inventors: Mohan Palaniyappan, Tiruchengodu (IN); Sankaralingam Madasamy, Tirunelveli (IN)

(73) Assignee: XEROX CORPORATION, Norwalk, CT (US)

( * ) Notice: Subject to any disclaimer, the term of this patent is extended or adjusted under 35 U.S.C. 154(b) by 150 days.

(21) Appl. No.: 15/482,852

(22) Filed: Apr. 10, 2017

(65) Prior Publication Data

US 2018/0293731 A1 Oct. 11, 2018

(51) Int. Cl.

| | |
|---|---|
| *G06T 3/60* | (2006.01) |
| *G06T 7/11* | (2017.01) |
| *H04N 1/10* | (2006.01) |
| *H04N 1/21* | (2006.01) |
| *G06T 7/13* | (2017.01) |
| *G06T 7/168* | (2017.01) |
| *G06T 5/00* | (2006.01) |

(52) U.S. Cl.
CPC .................. *G06T 7/11* (2017.01); *G06T 3/60* (2013.01); *G06T 5/005* (2013.01); *G06T 7/13* (2017.01); *G06T 7/168* (2017.01); *H04N 1/10* (2013.01); *H04N 1/2166* (2013.01); *G06T 2207/10024* (2013.01); *G06T 2207/20061* (2013.01); *G06T 2207/30176* (2013.01); *G06T 2207/30242* (2013.01); *H04N 2201/0094* (2013.01)

(58) Field of Classification Search
None
See application file for complete search history.

(56) References Cited

U.S. PATENT DOCUMENTS

| 7,110,612 B1 * | 9/2006 | Wang ....................... G06K 9/40 |
| | | 348/607 |
| 9,241,084 B2 | 1/2016 | Isaev |
| 2005/0012866 A1 * | 1/2005 | Chiang .................... G06T 5/20 |
| | | 348/625 |

\* cited by examiner

*Primary Examiner* — Mark Roz

(57) ABSTRACT

The present disclosure discloses methods and systems (for example multi-function devices) for segmenting multiple documents from a single input image. The multi-functional device includes a controller unit having a boundary extraction module to process an input image having multiple documents. The processing is performed using a computer implemented sum of absolute difference (SAD) based edge detection technique, to identify potential edge pixels and the region of interest pixels of the plurality of document images. Based on the identified potential edge pixels, perimeter boundaries surrounding each of the plurality of document images are determined. The determined perimeter boundaries and ROI pixels (Image mask for each document) in the input image are then segmented to create separate pages or files for each of the documents present within the input image for the purpose of printing separate files.

20 Claims, 11 Drawing Sheets

METHODS AND SYSTEMS FOR SEGMENTING MULTIPLE DOCUMENTS FROM A SINGLE INPUT IMAGE

TECHNICAL FIELD

The present subject matter relates generally to scanning and more particularly to methods and systems for segmenting multiple documents from a single electronic image in a single-pass scanning.

BACKGROUND

Multi-functional device having scanning, faxing, or other functionalities, can be operated either for capturing a digital image of a document, such as paper, or for printing the document on a medium such as paper. To capture and print the document, the multi-functional device can operate in various manners. Typically, construction of the multi-functional device is such that the multi-functional device may be operable for imaging or scanning one document at one time. For example, the multi-functional device may operate its image-capturing mechanism, such as a scan head of a scanner, including lamp light to capture one single image of a single document placed on a scan glass surface or flatbed surface of the multi-functional device.

However, there are many situations where multiple documents are to be captured or scanned using the multi-functional device. In such cases, the multi-functional device can be operable in two different capturing manners. For example, in one case, the multi-functional device may be operable to separately capture, one by one, an individual image for each of the multiple documents at different time points. Such capturing manner may be tedious in case the size of the document is large and may be time consuming as individual multiple documents are to be captured separately. In another case, the multi-functional device may be able to capture one image of the multiple documents at one time. In other words, a single image is captured for multiple documents, and that single image includes multiple images corresponding to those multiple documents. With such capturing manner, individual documents cannot be printed separately from the single captured image. Therefore, there is a need for such methods and systems that allow segmenting and printing multiple documents from the single captured image.

SUMMARY

This summary is provided to introduce concepts related to methods and devices for segmenting multiple documents from a single electronic image in a single-pass scanning. The concepts are further described below in the detailed description. This summary is not intended to identify essential features of the claimed subject matter nor is it intended for use in determining or limiting the scope of the claimed subject matter.

In one implementation, a method for segmenting multiple documents from a single input image is disclosed. The method includes receiving an input image including the multiple documents. Then, the received input image is processed using a computer implemented sum of absolute difference (SAD) based edge detection technique, to identify potential edge pixels (refers to boundary pixel and the region of interest pixels for each document) of the multiple documents. Thereafter, each color separation of the input image is segmented into equal size overlapped sub-images for each pixel and for each sub-image. For each sub-image, a maximum pixel value is determined for each color separation. Then, a SAD value is computed between the maximum pixel value and values of pixels present in the sub-image for each color separation. The SAD values computed for each color separation are then averaged to generate an average SAD value. The generated average SAD value is then compared with a defined threshold value to identify whether the pixels/locations present in the sub-image are potential edge pixels. For example, in case the average SAD value is above the defined threshold value, then it may be asserted that the pixels present in the sub-image are potential edge pixels. Based on the identified potential edge pixels, perimeter boundaries surrounding a region of interest corresponding to each of the multiple documents are determined using morphological operations. Thereafter, an image mask representing the region of interest is generated for each of the multiple documents. Based on the determined perimeter boundaries and the generated image mask representing the region of interest for each document, the multiple documents are segmented from the input image, and separate document files for each of the segmented multiple documents are printed.

In another example implementation, a multi-functional device for segmenting multiple documents from a single input image is disclosed. The multi-function device includes a controller unit. The controller unit includes a processor, a boundary extraction module coupled to the processor, and a segmentation module coupled to the processor. The boundary extraction module is configured to: receive an input image having multiple documents; and identify potential edge pixels of the multiple documents using a computer implemented sum of absolute difference (SAD) based edge detection technique. The technique includes: segment each color separation of the input image into equal sized overlapped sub-images for each pixel, and for each sub-image; determine a maximum pixel value for each color separation in the each sub-image; compute the SAD value between the maximum pixel value and pixel values in the sub-image for each color separation; determine average SAD value of the SAD values computed in the sub-image for each color separation; and based on the average SAD value, identify the pixels of the sub-image as the potential edge pixels. The boundary extraction module is configured to: determine perimeter boundaries surrounding a region of interest corresponding to each of the multiple documents using morphological operations, based on the identified potential edge pixels. The segmentation module is configured to: segment the multiple documents in the input image based on the determined perimeter boundaries and the generated image mask representing the region of interest for each of the multiple documents; and storing separate document image files for each of the segmented multiple documents.

In yet another example implementation, a non-transitory computer-readable medium implementing the subject matter includes instructions executable by a processing resource. The instructions are executed to receive an input image having multiple documents; and identify potential edge pixels of the multiple documents using a computer implemented sum of absolute difference (SAD) based edge detection technique. The technique includes segment each color separation of the input image into equal sized overlapped sub-images for each pixel, and for each sub-image; determine a maximum pixel value for each color separation; compute the SAD value between the maximum pixel value and pixel values in the sub-image for each color separation; determine average SAD value of the SAD values computed in the sub-image for each color separation; and based on the average SAD value, identify the pixels of the sub-image as the potential edge pixels. The instructions are executed to: based on the identified potential edge pixels, determine perimeter boundaries surrounding a region of interest corresponding to each of the multiple documents using one or more morphological operations; generate an image mask representing the region of interest for each of the multiple documents; segment the multiple documents in the input image based on determined perimeter boundaries and generated image mask representing the region of interest for each of the multiple documents; and print separate document files for each of the segmented multiple documents.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DETAILED DESCRIPTION

Figure 1:
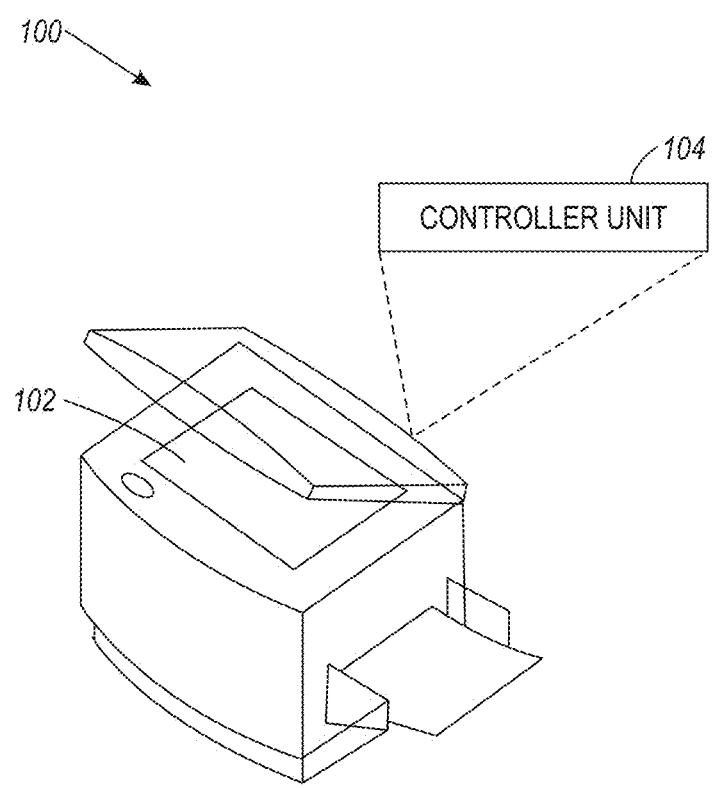
FIG. 1 illustrates a schematic of a multi-functional device, according to an example.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Definitions of one or more terms that will be used in this disclosure are described below without limitations. For a person skilled in the art, it is understood that the definitions are provided just for the sake of clarity, and are intended to include more examples than just provided below.

Definitions

The term "input image" refers to a scanned image or an electronic image obtained after scanning one or more documents of a user. The input image is the image having one or more images of documents scanned or provided by the user to a multi-functional device. In some implementations, the input image may also be referred to as single scanned multiple documents image, where the single scanned input image contains images of multiple documents.

"Documents" refer to documents of a user which are submitted to the multi-functional device for scanning. For example, the document may include, but not limited to, an ID proof, an address proof, a degree certificate, and the like. The documents are generally in the form of hard copies. Each document may include text, image, graphics, and a combination thereof.

"Region of interest" or edge pixels refers to a boundary of an image and the pixels of a document scanned by the multi-functional device.

The term "multi-functional device" refers to a device or a combination of multiple devices configured to perform one or more functions, but not limited to, scanning, printing, copying, imaging, and so forth. The multi-functional device includes software, hardware, firmware, or combination thereof. In the context of the present disclosure, the multi-functional device scans multiple documents in a single pass and then prints each documents individually.

The term "controller unit" refers to a unit implemented in the multi-functional device for identifying the region of interest in an input image, i.e., boundary of a document and retrieve individual documents from the input image for various purposes. For example, the retrieved individual documents may be stored over a network or may also be printed on the fly by the multi-functional device.

"Computer-readable medium" or "storage medium" may be a physical medium that can store data. Examples of "computer-readable medium" may include magnetic medium such as diskettes, floppy disks, and tape; optical medium such as laser disks and CD-ROMs; and semiconductor medium such as semiconductor ROMs and RAMs. As used herein, "storage medium" covers one or more distinct units of a medium that together store a body of data. For example, a set of floppy disks storing a single body of data are together be storage medium.

Overview

Several attempts have been made in the past to segment the individual documents from a single input image. One such attempt focuses on providing a two pass scanning process, in which a multi-functional device may identify boundaries of individual documents in first pass with reduced resolution, and scans the actual individual documents in second pass with high resolution. However, the two pass scanning process involves at least two cycles of scanning process of the documents. This in turn doubles the usage of the lamp light and the power consumption associated with the lamp light. As a result, the life of the lamp light of the multi-functional device is substantially reduced.

Various method(s) and device(s) of the present subject matter described herein allow multi-way operation of a multi-functional device. Further, as per the present subject matter, the multi-functional device may operate in a plurality of operating modes, for example, in a first operating mode and a second operating mode. As an example, in the first operating mode when the multi-functional device captures a single image file of one or more documents, the multi-functional device can be operated in a conventional capturing manner. In the second operating mode when the multi-functional device captures different image files for multiple documents, the multi-functional device can be operated in accordance with the various implementations and examples of the present subject matter.

In an implementation of the present subject matter, a multi-functional device includes a controller unit having a processor, and a boundary extraction module coupled to the processor. The boundary extraction module receives an input image from an input unit of the multi-functional device. In one example, the input unit may be a glass surface or flatbed surface of the multi-functional device. Further, the input image may include multiple document images corresponding to multiple documents. However, for the sake of brevity, the multiple document images may be referred to as multiple documents in the description hereinafter. In an example, a document may include, for example, a picture, text, graphics, or a combination thereof.

Once the input image is received, the input image is stored in a data buffer. From the data buffer, the image pixels corresponding to the input image is retrieved and processed using a computer implemented edge detection technique of the present disclosure. In one example, the edge detection technique may implement sum of absolute differences (SAD) based edge detection technique, in conjunction with other object recognition methods, to identify potential edge pixels of the multiple documents. As per the SAD based edge detection technique, the retrieved input image is separated into different color spaces. Examples of the color spaces may include RGB (Red, Green, and Blue) color space, CMYK (Cyan, Magenta, Yellow, and Key (Black)) color space and other color spaces. Thereafter, each of the color spaces is segmented into equal sized overlapped sub-images to identify the potential edge pixels or region of interest pixels.

For each sub-image, a maximum pixel value is determined for each color separation. Then a SAD value is computed between the maximum pixel value and values of pixels present in the sub-image of each color separation.

The SAD values computed for each color separation are then averaged to generate an average SAD value. The generated average SAD value is then compared with a defined threshold value to identify whether the pixels/locations present in the sub-image are potential edge pixels. For example, in case the defined threshold value is 19, then it may be asserted that the pixels present in the sub-image are potential edge pixels when the average SAD value is above the defined threshold value.

Based on the identified potential edge pixels of the multiple documents, perimeter boundaries surrounding each of the multiple documents present in the input image are determined using morphological operations.

In an implementation, the controller unit further includes a segmentation module coupled to the processor. The segmentation module segments the multiple documents present in the input image based on determined perimeter boundaries, and generates different image files corresponding to each multiple documents. For example, in case there are three documents are present in a single input image, then output of the segmentation module includes three different image files. In one example, the file format of the different image files can be either same or different, depending on predefined parameters fed in the controller unit. Finally, the three different image files are printed.

Exemplary Implementation

The following disclosure explains a mechanism where flatbed multi-functional devices, such as scanners, with some hardware and software enhancements are enabled to scan multiple documents in a single pass. In an example where the multiple documents are placed on a scan surface or flatbed surface of the multi-functional device, a controller unit implemented in the multi-functional device may enable the multi-functional device to create separate pages or files for each document placed on the scan surface or flatbed surface. Such controller unit is further described with reference to FIGS. 1-6.

It should be noted that that the description and the figures merely illustrate the principles of the present subject matter along with examples described herein, and should not be construed as a limitation to the present subject matter. It is, thus, understood that various arrangements may be devised that, although not explicitly described or shown herein, embody the principles of the present subject matter. Moreover, all the statements herein reciting principles, aspects, and implementations of the present subject matter, as well as specific examples thereof, are intended to encompass equivalents thereof.

Further, the present subject matter automatically identifies the individual document boundaries from a single scanned multiple documents electronic image and produces different individual image files corresponding to multiple documents for storing or printing the multiple documents separately. Also, the present subject matter is implementable in a low-cost single scanning phase. Such low-cost image single pass scanning process may reduce the usage of the lamp light and the power consumption associated with the lamp light by half, in comparison to existing approaches. This in turn enhances or increases the life of the lamp light of the multi-functional device.

FIG. 1 illustrates a schematic of a multi-functional device 100, according to an example of the present disclosure. The multi-functional device 100 may include, without any limitation, a multi-functional printer, a copier, a scanner, a facsimile machine, a digital camera, a camcorder, or a mobile phone. Further, the multi-functional device 100 includes an image-capturing mechanism (not shown in figures), such as a scan head of a scanner. The image-capturing mechanism includes a lamp light (not shown in figures) to capture or scan one or more documents placed on a glass surface or flatbed surface 102 of the multi-functional device 100. Each of the documents may include, for example, a picture or text or a combination thereof. Examples of the documents may include, but are not limited to, application forms, checks, identification proofs, supporting documents or any other related or otherwise applicable documents.

The multi-functional device 100 further includes a controller unit 104 for processing scanned or captured image of the documents. The controller unit 104 is communicatively coupled to an output mechanism (not shown in the figures) of the multi-functional device 100 to receive the captured image for further processing.

In an alternative example not shown in drawings, the multi-functional device 100 may be communicatively coupled to the controller unit 104 over a network (not shown in figures). In such example, the controller unit 104 may be implemented in a computing device (not shown in figures) which is communicatively coupled to the multi-functional device 100. Examples of the computing device may include personal digital assistants, smart phones, handheld devices, mobile phones, laptops and the like.

The network for communication may be a wireless or a wired network, or a combination thereof. The network can be a collection of individual networks, interconnected with each other and functioning as a single large network (e.g., the internet or an intranet). Examples of such individual networks include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the technology, the network includes various network entities, such as transceivers, gateways, and routers; however, such details have been omitted for ease of understanding.

Returning to the discussion of FIG. 1, a user may arrange multiple documents, say, three different documents on the flatbed surface 102 of the multi-functional device 100 for scanning or capturing an image of each document. After arranging the documents on the flatbed surface 102, the multi-functional device 100 prompts the user to provide input whether the user wants to have a single image file for all the documents or whether the user wants to have separate individual image files of each of the documents. In case the user provides an input to have a single image file for all the documents, the multi-functional device 100 scans and provides a single image file for the corresponding documents using a variety of known techniques. However, in case the user provides an input to have separate image files for each of the corresponding documents, the multi-functional device 100 generates a single input image and provides the same in the form of pixels to the controller unit 104 for further processing. Pixel is a location in an image. A pixel is the smallest segment into which an image is divided in a given system. Further, pixel value indicates the color and/or intensity of a location/pixel in an image. Each pixel value in a binary image is an electrical signal in a "binary form," a gray-scale value in a "gray-scale form" of an image, or a set of color space coordinates in a "color coordinate form" of an image. The binary form, the gray-scale form, and the color coordinate form each being a two-dimensional array defining an image. Hence, the term pixel may also refer to the electrical (or optical) signal representing the measurable optical properties of a physically definable region or location on an image. Lastly, the term pixel may refer to an electrical (or optical) signal representing physical optical property data generated from a photosensitive element when scanning a physical image, so as to convert the physical optical properties of the image to an electronic or electrical representation. In other words, a pixel is an electrical (or optical) representation of the optical properties of an image measured at a definable area by an optical sensor.

Returning to the present subject matter, upon receipt of the input image in the form of image pixels, the controller unit 104 processes the received image pixels using a computer implemented edge detection technique, to identify potential edge pixels of the multiple documents present in the input image. The controller unit 104 and the components and operation of the controller unit 104 are explained in further detail with reference to FIG. 2, FIGS. 3A-3D, and FIGS. 4A-4F.

Figure 2:
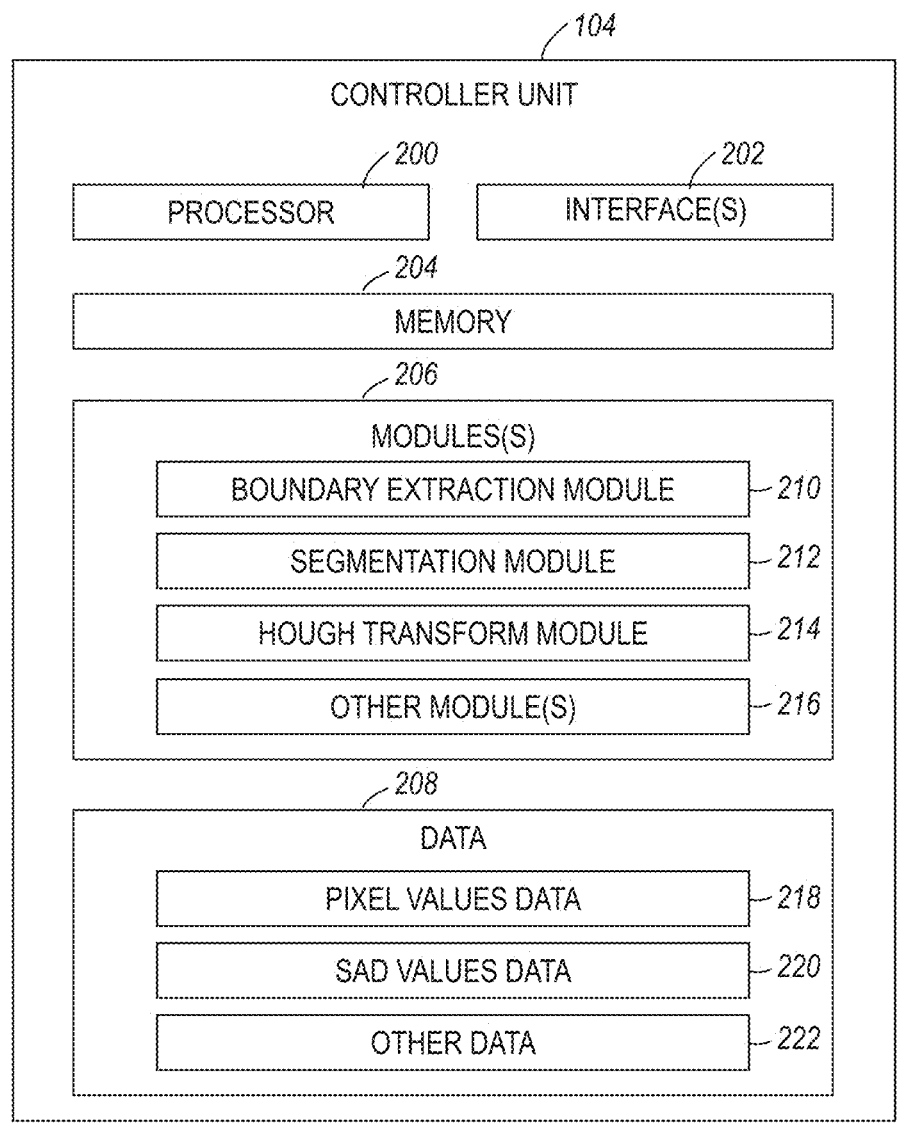
FIG. 2 illustrates a schematic of a controller unit implemented in the multi-functional device.

FIG. 2 illustrates various components of the controller unit 104, in accordance with one example of the present subject matter. The controller unit 104 includes a processor 200, an interface 202, and a memory 204. Further, the controller unit 104 include module(s) 206 and data 208.

The processor 200, amongst other capabilities, may be configured to fetch and execute computer-readable instructions stored in the memory 204. The processor 200 may be implemented as one or more microprocessors, microcomputers, microcontrollers, digital signal processors, central processing units, state machines, logic circuitries, and/or any devices that manipulate signals based on operational instructions. The functions of the various elements shown in the figure, including any functional blocks labeled as processor(s), may be provided through the use of dedicated hardware as well as hardware capable of executing software in association with appropriate software.

When provided by the processor 200, the functions may be provided by a single dedicated processor, by a single shared processor, or by a plurality of individual processors, some of which may be shared. Moreover, explicit use of the term processor should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional and/or custom, may also be included.

The interface(s) 202 may include a variety of machine readable instructions-based interfaces and hardware interfaces that allow the controller unit 104 to interact with different entities, such as the processor 200, the module(s) 206, and the data 208. Further, the interface(s) 202 may enable the components of the controller unit 104 to communicate with other controller unit, and external repositories. The interface 202 may facilitate multiple communications within a wide variety of networks and protocol types, including wireless networks, wireless Local Area Network (WLAN), RAN, satellite-based network, etc.

The memory 204 may be coupled to the processor 200 and may, among other capabilities, provide data and instructions for generating different requests. The memory 204 can include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The module(s) 206 may include routines, programs, objects, components, data structures, and the like, which perform particular tasks or implement particular abstract data types. The module(s) 206 may further include modules that supplement applications on controller unit 104. Further, the module 206 can be implemented in hardware, instructions executed by the processor 200, or by a combination thereof.

In one example, the module(s) 206 may be machine-readable instructions (software) which, when executed by a processor/processing unit, perform any of the described functionalities. The machine-readable instructions may be stored on an electronic memory device, hard disk, optical disk, or other machine-readable storage medium, or non-transitory medium. In one further example, the machine-readable instructions can also be downloaded to the storage medium via a network connection.

The data 208 serves, amongst other things, as a repository for storing data that may be fetched, processed, received, or generated by one or more of the module(s) 206.

The module(s) 206 may perform different functionalities which may include, but may not be limited to, receiving an input image containing multiple documents from the multi-functional device 102, processing the input image using a computer implemented edge detection technique to identify potential edge pixels of the multiple documents present in the input image, determining perimeter boundaries surrounding each of the multiple documents based on the identified potential edge pixels, segmenting the multiple documents present in the input image, and creating separate image files for each of the segmented multiple documents.

Accordingly, the module(s) 206 includes a boundary extraction module 210, a segmentation module 212, a Hough transform module 214, and other module(s) 216. The data 208 includes pixel values data 218, sum of absolute difference (SAD) values data 220, and other data 222. The other data 220 may include intermediate processing data related to image processing.

In operation, the boundary extraction module 210 of the controller unit 104 receives an input image including the multiple documents that are captured or scanned by the multi-functional device 100. The input image is received in the form of image pixels. The image pixels may be obtained through line by line scanning of the multiple documents by one or more photosensitive elements, such as a multiple photosensitive arrays of charge coupled devices, commonly referred to as CCD's.

Upon receipt of the input image, the boundary extraction module 210 applies a computer implemented edge detection technique. In one example implementation, the edge detection technique involves a segmentation algorithm provided below:

For $x=5$ to Image Width−5 do

For $y=5$ to Image Height−5 do

Step 1: Read the R, G, B color space input of size 11×11 with respect to X, Y position as follows and overlapped sub-image size for subsequent X, Y position.

$R_{subimage}$=InputColorImage($x-5$: $x+5$, $y-5$: $y+5$, Red);

$G_{subimage}$=InputColorImage($x-5$: $x+5$, $y-5$: $y+5$, Green);

$B_{subimage}$=InputColorImage($x-5$: $x+5$, $y-5$: $y+5$, Blue);

Step 2: Find Max value of sub-image for each separation (Rmax, Gmax, Bmax).

$R_{max}$=max ($R_{subimage}$);

Step 3: Find the Sum of absolute Difference between the max value and pixels of sub-image for each separation separately and compute the average.

$R_{avg}=R_{SAD}$/SubImageSize;

$G_{avg}=G_{SAD}$/SubImageSize;

$B_{avg}=B_{SAD}$/SubImageSize;

Step 4: Sum of Average of R,G,B Color=(Ravg+Gavg+Bavg).
Step 5: If (Ravg+Gavg+Bavg)>Threshold, Mark the image pixel(X, Y) as an edge pixel(X, Y) with value "255."
Step 6: Else, Mark the image pixel(X, Y) as non-edge Pixel with value "0."

As per the algorithm, the edge detection technique may separate the input image into Red (R), Green (G), Blue (B) color density signals, say, in individual RGB color spaces. In one alternative implementation, the separation of the input image into the individual RGB color spaces may be performed at the multi-functional device level by implementing CCD sensors or any other suitable electronics in the multi-functional device 100.

Based on the algorithm, the edge detection technique segments the received input image into smaller equal overlapped pixel size of, say, 11×11, sub-images. Then, for each of the sub-images, the edge detection technique determines a maximum pixel value of each separation (R, G, B) or color in the sub-image, followed by determining of pixel values of each pixel present in the sub-image. In one example, a pixel value in the sub-image is indicative of a color density image signal. In other words, a pixel value is indicative of the color and intensity of a respective pixel in the sub-image. For example, a pixel value ranging from 1 to 255 representing the color of a pixel, or a luminance value of the pixel, while pixel value of 0 is used to represent that the pixel belongs to the background layer.

Once the maximum pixel value of each separation and the pixel values in a sub-image are determined, these pixel values are stored in the pixel values data 218. Thereafter, the edge detection technique computes the sum of absolute differences (SAD) values between the maximum pixel value and the pixel values in the sub-image for each separation or color separately. The computed different SAD values for the sub-image are averages for each separation or color.

SAD value is a measure of similarity or dissimilarity between image blocks. SAD value is computed by taking absolute differences between each pixel value in the image block and a corresponding pixel value, maximum pixel value in present case. These differences are then summed to create a simple metric of block similarity or dissimilarity between two pixel values for determining edge of a given input image.

Further, as mentioned above, each pixel value may be represented by an integer ranging from 0 to 255. With this, in case the maximum pixel value in each separation or color (R, G, B) is 9. Then, this maximum pixel value 9 is compared with each pixel value (e.g., 2, 4, 5, 6, 7, etc.) in the 11×11 sub-image to determine individual absolute difference values between each pixel value and the maximum pixel value. These individual absolute difference values corresponding to each pixel/location are then added together to calculate the average SAD value for the sub-image in each separation or color. The so calculated average SAD value is stored in the SAD values data 220.

In an example, for the sub-image, considering that the average SAD value is 10 in Red separation, 11 in Green separation, and 09 in Blue separation. In such scenario, the average SAD values of the Red, Green, and Blue separations are added to give a sum of average SAD value of about 30 for the sub-image. Such sum of average SAD value is then compared with a defined threshold value to identify whether the pixels/locations present in the sub-image are potential edge pixels. In one example, the defined threshold value may be 19. With such threshold value, it may be asserted that pixels in the sub-image are potential edge pixels and marked with pixel value of "255" when the average SAD value is above a defined threshold value of, say, 19. Otherwise, in case where the sum of average SAD value is below the defined threshold value, then those pixels in the sub-image are marked with pixel value of "0" and are treated as non-edge pixels or as background pixels.

The above described process is repeated by the edge detection technique for all the pixels in the input image with overlapped 11×11 sub-images until the entire input image is processed to identify potential edge pixels of the multiple documents present within the input image.

Figure 3A:
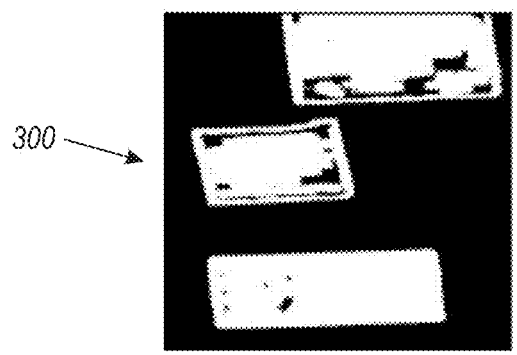
FIGS. 3A-3D illustrate an operation of the controller unit.
Figure 3B:
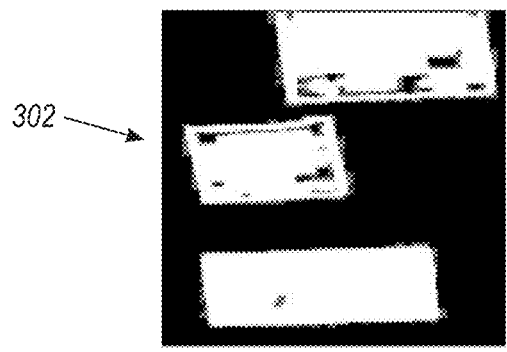
Figure 3C:
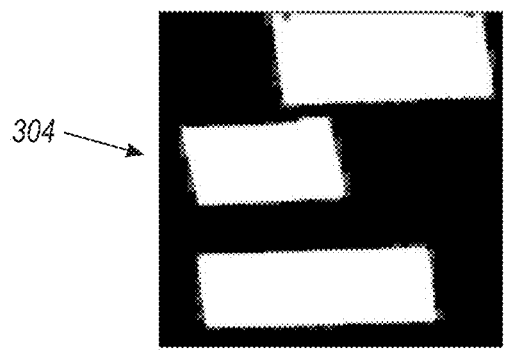
Figure 3D:
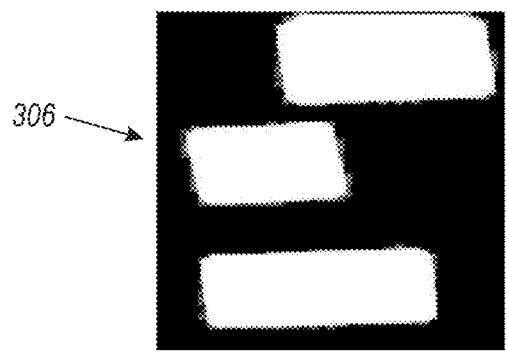
Figure 4A:
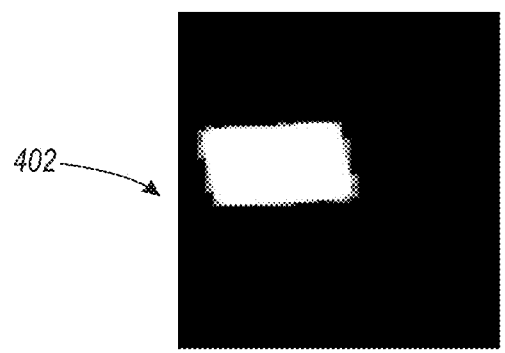
FIGS. 4A-4F illustrate an operation of the controller unit, according to an example.
Figure 4B:
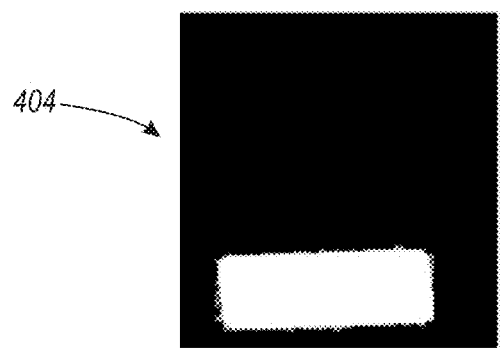
Figure 4C:
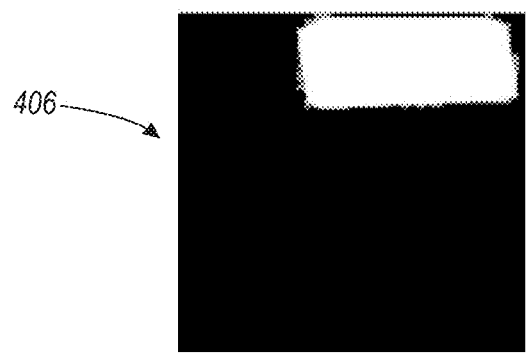
Figure 4D:
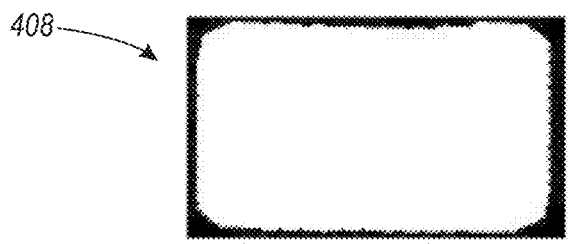
Figure 4E:
Figure 4F:
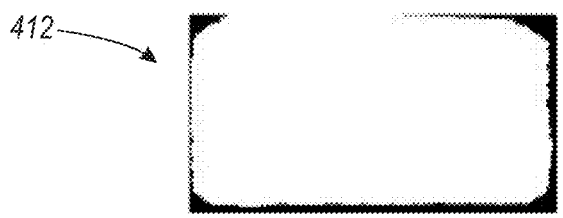

Once the potential edge pixels are identified, the boundary extraction module 210 determines perimeter boundaries surrounding a region of interest corresponding to each of the multiple documents using the identified potential edge pixels (snapshot 300 of FIG. 3A).

In one implementation, the determined perimeter boundaries are further processed by performing closing operation. The closing operation is a morphological operation consisting of a dilation operation followed by an erosion operation. That is, the closing operation tends to enlarge (dilation) the determined perimeter boundaries of the multiple documents, followed by shrinking (erosion) the background color holes or pixels in the input image. In other words, in the closing operation, the closing of the determined perimeter boundaries at the potential edge pixels is equivalent to closing the background of the input image in the region of the potential edge pixels (snapshot 302 of FIG. 3B).

The closing operation is followed by another morphological operation known as filling operation. The filling operation is applied to remove unfilled holes/pixels present within a region of interest surrounded or enclosed by the identified potential edge pixels or the perimeter boundaries. The unfilled holes are removed by filling the unfilled holes with either pixel values that represent colors that are similar to the color of pixels present in the region of interest or with the pixel values of the pixels that are in the vicinity of each of the unfilled holes (indicated by snapshot 304 of FIG. 3C).

The filling operation is followed by another morphological operation known as an opening operation. The opening operation is applied to the identified potential edge pixels to clean the image border. In one example, the opening operation consists of an erosion operation followed by a dilation operation. For example, in case the potential edge pixels may result into the perimeter boundaries having growing tiny hairline leaks or dispersion, then the opening operation removes the tiny hairline leaks in such a way that the potential edge pixels are cleaned to provide a clear perimeter border of the multiple documents (refer to snapshot 306 of FIG. 3D). Further, with the implementation of the closing, filling, and opening operations, noise can be easily removed from the multiple documents having small size of less than 100×100.

After the completion of the closing, filling, and opening operations, the boundary extraction module 210 calculates the number of documents present within the input image using morphological connected component analysis on the document image. In one example, the morphological component analysis is based on an example pseudo code provided herein below:

Step 1: Compute the Object$_{Area}$ of each identified ROI (Region of Interest) or each document in the processed image (Edge pixel(X, Y)).

Step 2: Suppress the ROI of Object$_{Area\ as}$ background region when the Object$_{Area}$ is less than 10000.

Step 3:

For x=1 to numOfObject do

If (Object$_{Area}$>(10000)), Valid ROI or Individual document.

Else, mark the image pixel(X, Y) as a Background Pixel with value "0."

Once the number of the multiple documents is calculated, the boundary extraction module 210 invokes the segmentation module 212. The segmentation module 212 then segments the multiple documents present in the input image into separate images. In an example, the segmenting is performed by using selective segmented mask image technique. With the segmented mask image technique, a mask of images of multiple documents is extracted one by one (indicated as 402, 404, and 406 in FIGS. 4A, 4B, 4C, respectively). Mask of an image normally contains substantially solid regions of pixels corresponding to the region of interest, surrounded or enclosed by the identified potential edge pixels or the perimeter boundaries, in the input image.

After extraction of different images of the multiple documents present in the input image, the segmentation module 212 creates separate pages or files for each document present within the input image. In one example, these extracted document image files are compressed using known compressing technologies and stored in one of a storage device or a memory device.

Further, in one optional example, after extraction and before storing the multiple documents, the segmentation module 212 invokes Hough transform module 212 to perform Hough transform on the edges of the multiple documents present in the input image to determine non-zero values of orientation of the individual documents. In case non-zero orientation values are determined, the Hough transform module 214 rotates the individual images (408, 410 and 412 in FIGS. 4D, 4E, 4F, respectively) for correcting the non-zero orientation values (FIGS. 4D-4F), before handing back the extracted documents to the segmentation module 212 for further processes including, but not limited to, outputting, creating, printing, or storing in separate document image files.

Figure 5:
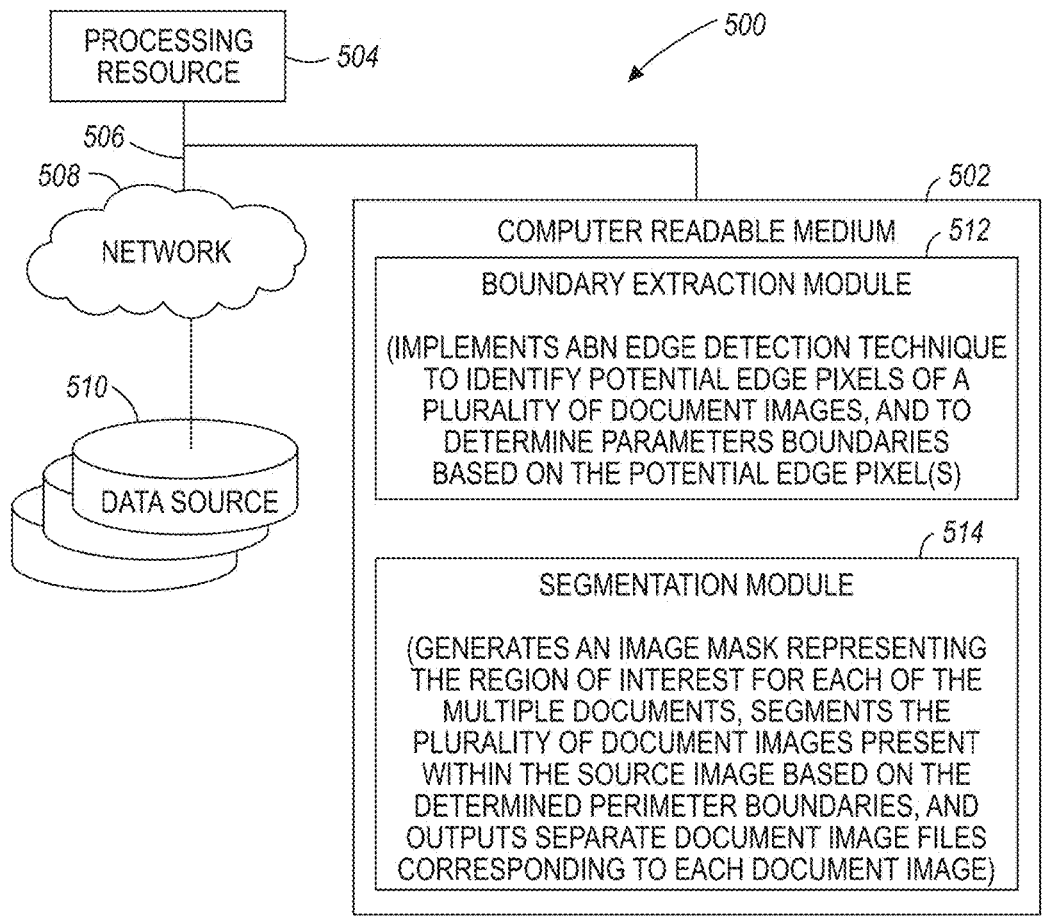
FIG. 5 illustrates a network environment for operating the controller unit.

FIG. 5 illustrates an example network environment 500 using a non-transitory computer readable medium 502 for stalling operation of the controller unit 104, according to an example of the present subject matter. The network environment 500 may be a public networking environment or a private networking environment. In one example, the network environment 500 includes a processing resource 504 communicatively coupled to the non-transitory computer readable medium 502 through a communication link 506.

For example, the processing resource 504 can be a processor, such as the control device of the multi-functional device 100. The non-transitory computer readable medium 502 can be, for example, an internal memory device or an external memory device. In one example, the communication link 506 may be a direct communication link, such as one formed through a memory read/write interface. In another example, the communication link 506 may be an indirect communication link, such as one formed through a network interface. In such a case, the processing resource 504 can access the non-transitory computer readable medium 502 through a network 508. The network 508 may be a single network or a combination of multiple networks and may use a variety of communication protocols.

The processing resource 504 and the non-transitory computer readable medium 502 may also be communicatively coupled to data sources 510 over the network 508. The data sources 510 can include, for example, databases and computing devices. The data sources 510 may be used by the database administrators and other users to communicate with the processing resource 504.

In one example implementation, the non-transitory computer readable medium 502 includes a set of computer readable instructions, such as a boundary extraction module 512 and a segmentation module 514. The set of computer readable instructions, referred to as instructions hereinafter, can be accessed by the processing resource 504 through the communication link 506 and subsequently executed to perform acts for network service insertion. In other words, during operation the processing resource 504 can execute the boundary extraction module 512 and the segmentation module 514.

On execution by the processing resource 504, the boundary extraction module 512 receives an input image in the form of image pixels from an image source. In one example, the image source can be flatbed scanning surface of the multi-functional device 100. Further, the input image may include multiple documents. A document may include, for example, a picture or text or a combination thereof. Once received, the input image is stored in a data buffer. From the data buffer, the image pixels corresponding to the input image may be retrieved and processed using a computer implemented edge detection technique of the present subject matter.

In one example, the edge detection technique implements sum of absolute differences (SAD) edge detection methods, in conjunction with other object recognition methods, to identify potential edge pixels of the multiple documents. The edge detection methods are described above in detail with reference to FIG. 2, FIGS. 3A-3D, FIGS. 4A-4F. Based on the identified potential edge pixels of the multiple documents, perimeter boundaries surrounding a region of interest corresponding to each of the multiple documents are determined by the boundary extraction module 512 using one or more morphological operations.

Further, once the perimeter boundaries are determined, the segmentation module 514 generates an image mask representing the region of interest for each of the multiple documents. Thereafter, based on the determined perimeter boundaries and the generated image mask representing the region of interests, the segmentation module 514 segments the multiple documents present in the input image. The segmented documents are then outputted, created, printed, or stored in separate files.

Thus, the controller unit 104 described herein is advantageous because it is inexpensive compared to existing approaches and is flexible as it can be adapted to any number of input documents exhibiting a wide range of possible patterns. Furthermore, in the present controller unit 104, the scanning of the documents may be accomplished by a low-cost image single pass scanning process. Such single pass scanning process may reduce the usage of the lamp light and the power consumption associated with the lamp light by half, in comparison to existing approaches. This in turn enhances or increases the life of the lamp light of the multi-functional device 100.

Figure 6:
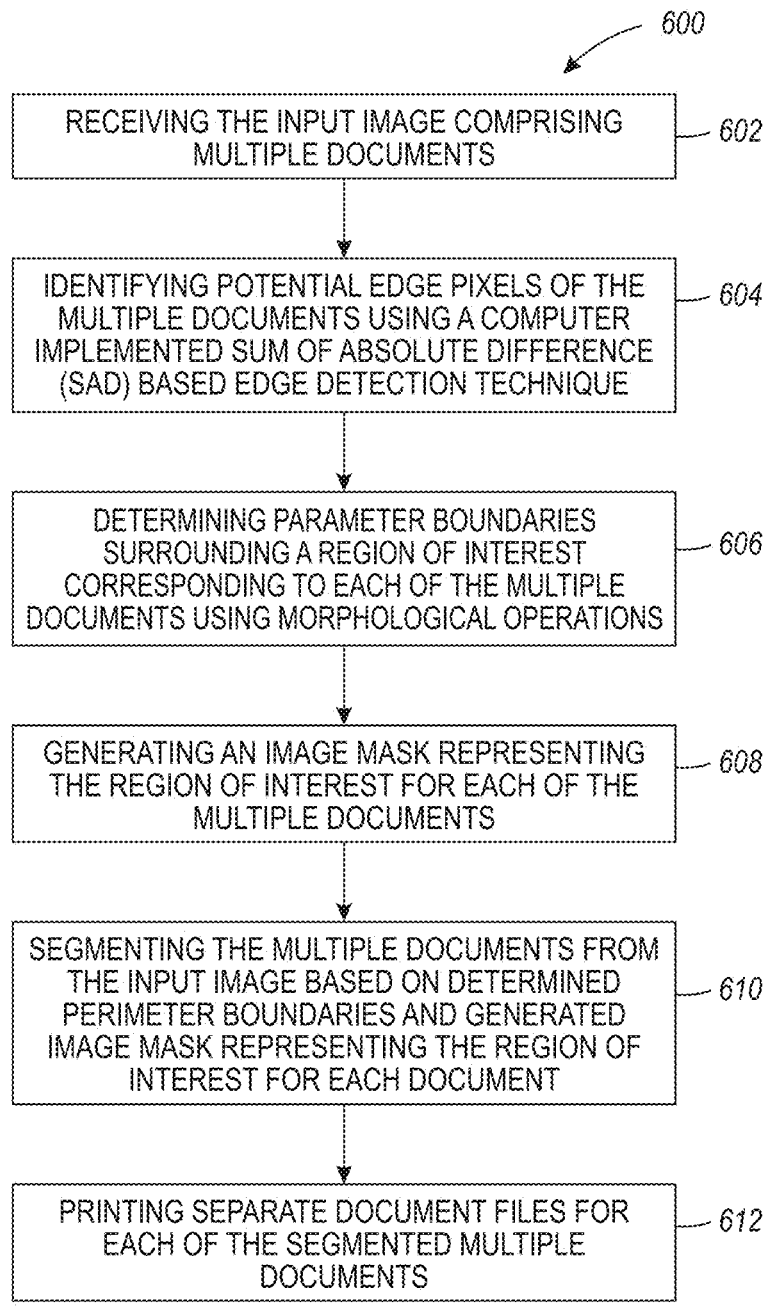
FIG. 6 illustrates a method for operating the controller unit, according to an example.

Method 600 is described in FIG. 6 for operating the controller unit 104, according to an example of the present subject matter. The order in which the method 600 is described is not intended to be construed as a limitation, and any number of the described method blocks can be combined in any appropriate order to carry out the method 600 or an alternative method. Additionally, individual blocks may be deleted from the method 600 without departing from the scope of the subject matter described herein.

The method 600 can be performed by programmed computing devices, for example, based on instructions retrieved from the non-transitory computer readable medium or non-transitory computer readable media. The computer readable media can include machine-executable or computer-executable instructions to perform all or portions of the described method. The computer readable media may be, for example, digital memories, magnetic storage media, such as a magnetic disks and magnetic tapes, hard drives, or optically readable data storage media.

Referring to FIG. 6, the method 600 may be performed by a control device, such as the control device of the controller unit 104.

At block 602, the controller unit 104 may receive an input image. The input image is received in the form of image pixels from an input unit. In one example, the input unit can be flatbed surface 102 of the multi-functional device 100. Further, the input image may include a plurality of images corresponding to the multiple documents. A document may include, for example, a picture or text or a combination thereof.

At block 604, the received image pixels corresponding to the input image are retrieved and processed using a computer implemented edge detection technique of the present subject matter. The edge detection technique implements a sum of absolute differences (SAD) edge detection algorithm, in conjunction with other object recognition methods, to identify potential edge pixels of the multiple documents. The edge detection algorithm is described above in detail with reference to FIG. 2, FIGS. 3A-3D, FIGS. 4A-4F.

At block 606, perimeter boundaries surrounding a region of interest corresponding to each of the multiple documents may be determined based on the identified potential edge pixels of the multiple documents. In one example, the perimeter boundaries are determined using one or more morphological operations.

At block 608, an image mask representing the region of interest for each of the multiple documents is generated.

At block 610, the multiple documents present in the input image are segmented based on determined perimeter boundaries and generated image mask representing the region of interest.

At block 612, the separate document files are printed for each of the segmented multiple documents.

Thus, the controller unit 104 described herein is advantageous because it is inexpensive compared to existing approaches and is flexible, in that it can be adapted to any of a number of input documents exhibiting a wide range of possible patterns. Furthermore, in the present controller unit 104, the scanning of the documents may be accomplished by a low-cost image single pass scanning process. Such single pass scanning process may reduce the usage of the lamp light and the power consumption associated with the lamp light by half, in comparison to existing approaches. This in turn enhances or increases the life of the lamp light of the multi-functional device 100.

Figure 7A:
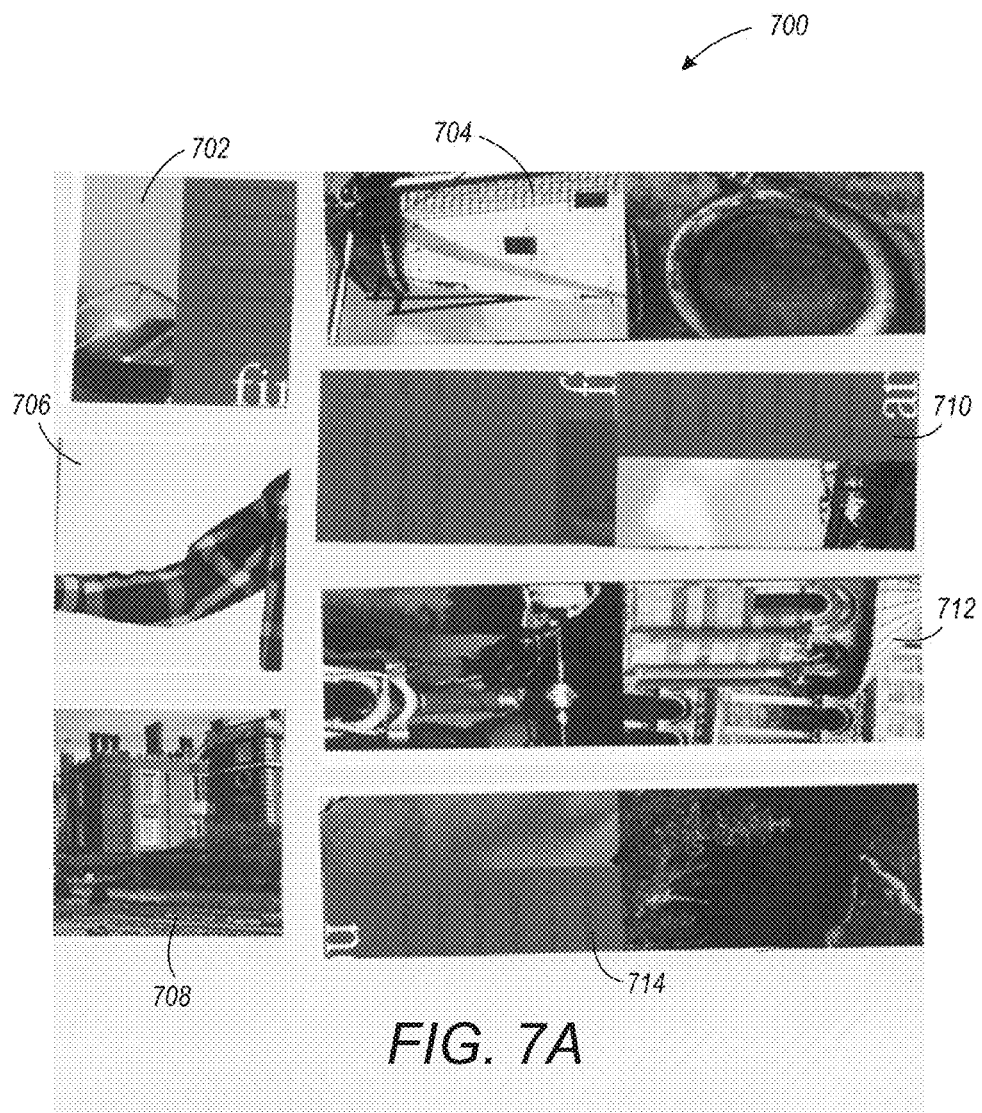
FIGS. 7A-7H show an input and an output, according to an embodiment of the current disclosure.
Figure 7B:
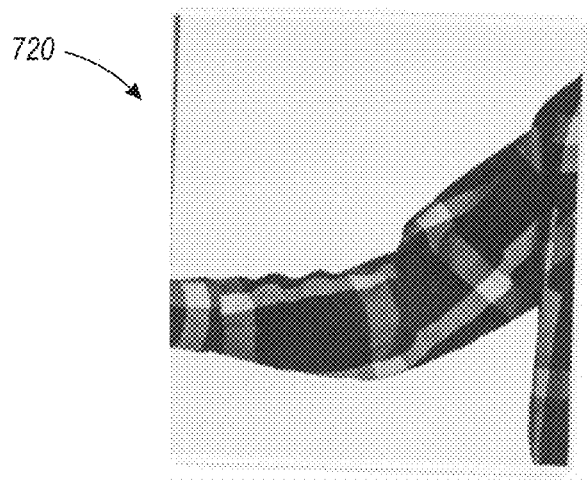
Figure 7C:
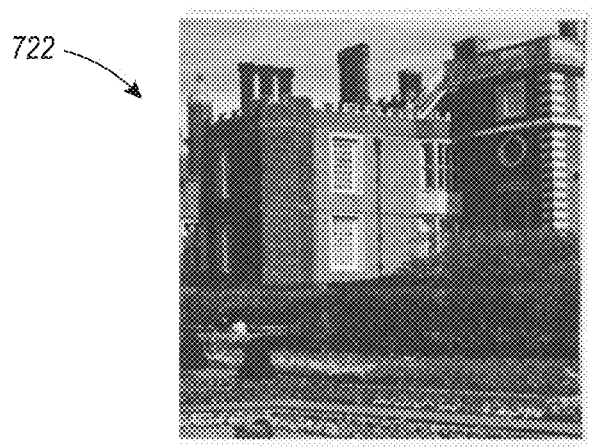
Figure 7D:
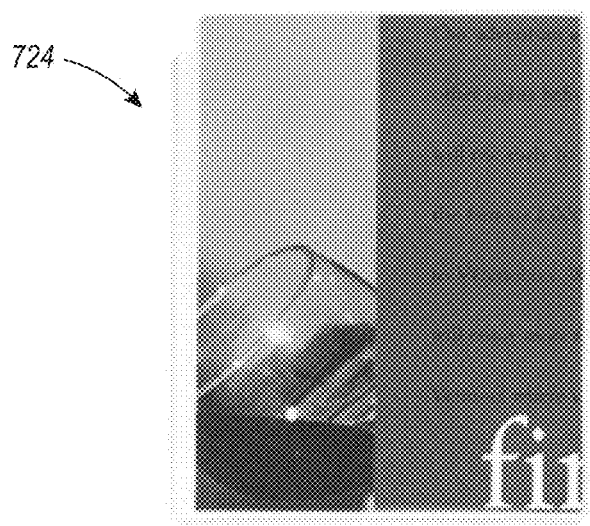
Figure 7E:
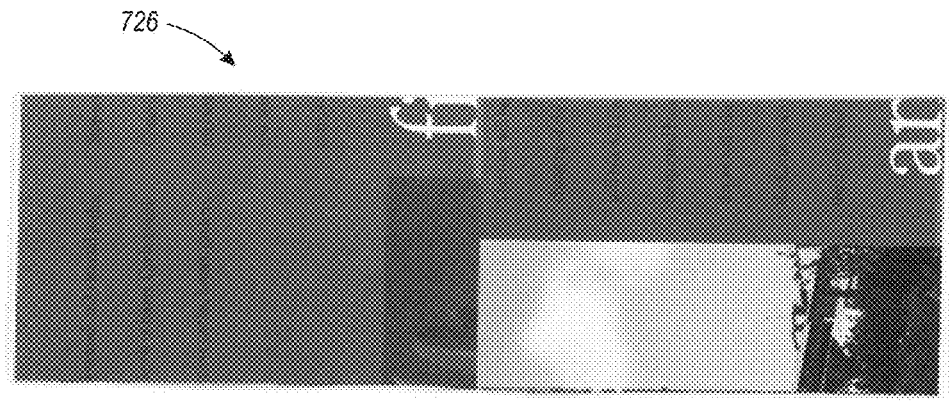
Figure 7F:
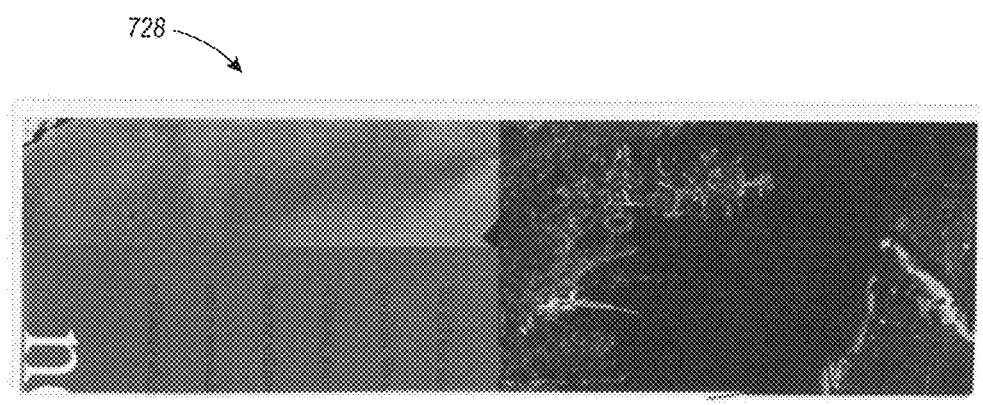
Figure 7G:
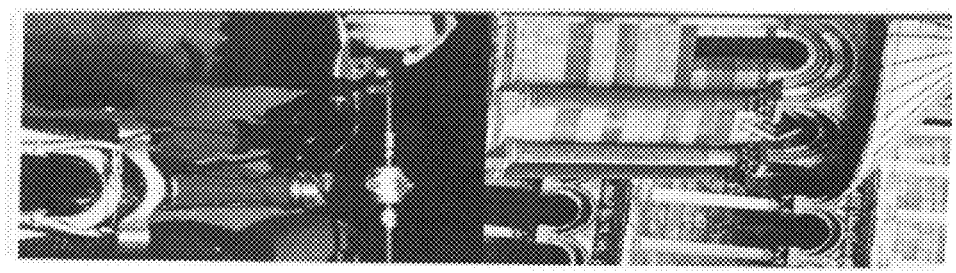
Figure 7H:
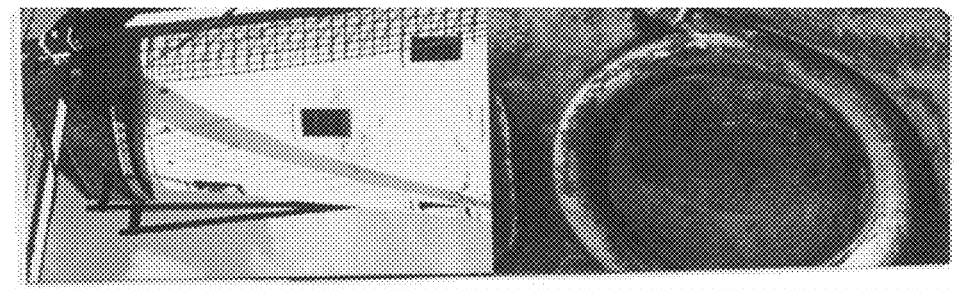

For better understanding, the input and output are shown in FIGS. 7A-7H. FIG. 7A shows an input image, i.e., a single scanned image 700 obtained after scanning multiple documents marked as 702, 704, 706, 708, 710, 712, and 714 as placed on a platen for scanning. The scanned image is the single pass scanned image and the single pass scanned image is the input received for processing by the methods and systems of the present disclosure. The methods and systems of the present disclosure generate the output as shown in FIGS. 7B-7H. The images which are a part of the single pass scanned image 700 are segmented as individual images 720 in FIG. 7B (corresponding to 706), 722 in FIG. 7C (corresponding to 708), 724 in FIG. 7D (corresponding to 702), 726 in FIG. 7E (corresponding to 710), 728 in FIG. 7F (corresponding to 714), 730 in FIG. 7G (corresponding to 712) and 732 in FIG. 7H (corresponding to 704). The individual images can be printed finally as required by the user.

The present disclosure discloses methods and systems for segmenting multiple documents from a single scanned image. The methods and systems allow a user to scan multiple documents in a single pass and further prints them separately resulting in improved lamp life with reduced power consumption. Further, the disclosure promotes toner usage reduction due to suppression of pixels which are beyond the region of interest in the original document. In addition, the methods and systems automatically segment the documents in one pass itself.

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the present disclosure, numerous references may be made regarding services, units, modules, interfaces, devices, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, within the context of the present disclosure, the disclosed devices or units are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that in the present disclosure all of these and similar terms are to be associated with the appropriate physical quantities and are merely convenient labels applied to these quantities. Unless specifically stated otherwise, as apparent from the discussion herein, it is appreciated that throughout the description, disclosure utilizing terms such as "generating," or "determining," or "receiving," or "computing," or "identifying," "or processing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary implementations also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the present disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the implementations and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for segmenting multiple documents from a single input image, comprising:
   receiving the input image comprising the multiple documents;
   identifying potential edge pixels of the multiple documents using a computer implemented sum of absolute difference (SAD) based edge detection technique, wherein the identifying comprising:

segmenting each color separation of the input image into equal sized overlapped sub-images for each pixel, and for each sub-image;

determining a maximum pixel value for each color separation in the each sub-image;

computing the SAD value between the maximum pixel value and pixel values in the sub-image for each color separation;

determining average SAD value of the SAD values computed in the sub-image for each color separation; and based on the average SAD value, identifying the pixels of the sub-image as the potential edge pixels;

based on the identified potential edge pixels, determining perimeter boundaries surrounding a region of interest corresponding to each of the multiple documents using morphological operations;

generating an image mask representing the region of interest for each of the multiple documents;

based on determined perimeter boundaries and generated image mask representing the region of interest for each document, segmenting the multiple documents from the input image; and printing separate document files for each of the segmented multiple documents.

2. The method as claimed in claim 1, wherein the identifying potential edge pixels of the multiple documents comprising separating the input image in Red (R), Green (G), Blue (B) color spaces.

3. The method as claimed in claim 1, wherein identifying potential edge pixels of the sub-image as the potential edge pixels when the average SAD value is above a defined threshold value.

4. The method as claimed in claim 3, wherein the defined threshold value is 19.

5. The method as claimed in claim 1, wherein determining of perimeter boundaries comprising:

performing closing operation on each of the multiple documents present in the input image;

performing hole-filling operation to fill holes with pixel values that represent colors that are similar to the color of background pixels that are in the vicinity of each of the holes; and following closing and hole filling operation, counting the number of documents present in the input image.

6. The method as claimed in claim 1, further comprising:

extracting individual images for each of the segmented documents using selective segmented mask image technique;

compressing the extracted images corresponding to the multiple segmented documents; and storing the extracted images in separate files on one of a storage device and a memory device.

7. The method as claimed in claim 1, further comprising:

performing Hough transform on the edges of each of the multiple documents to determine non-zero value of orientation of the individual documents; and rotating the individual documents for the non-zero value of the orientation determined by the Hough transform.

8. A multi-functional device for segmenting multiple documents from a single input image, comprising:

a controller unit comprising:
 a processor;
 a boundary extraction module, coupled to the processor, to:

receive an input image having multiple documents;

identify potential edge pixels of the multiple documents using a computer implemented sum of absolute difference (SAD) based edge detection technique, wherein the technique comprises:

segment each color separation of the input image into equal sized overlapped sub-images for each pixel, and for each sub-image;

determine a maximum pixel value for each color separation in each sub-image;

compute the SAD value between the maximum pixel value and pixel values in the sub-image for each color separation;

determine average SAD value of the SAD values computed in the sub-image for each color separation; and based on the average SAD value, identify the pixels of the sub-image as the potential edge pixels; and based on the identified potential edge pixels, determine perimeter boundaries surrounding a region of interest corresponding to each of the multiple documents using morphological operations; and a segmentation module, coupled to the processor, to:

generate an image mask representing the region of interest for each of the multiple documents;

segment the multiple documents in the input image based on the determined perimeter boundaries and the generated image mask representing the region of interest for each of the multiple documents; and storing separate document image files for each of the segmented multiple documents.

9. The multi-function device as claimed in claim 8, further comprising a flatbed scanning surface upon which the multiple documents are placed for receiving the input image.

10. The multi-function device as claimed in claim 8, wherein the boundary extraction module identifies the potential edge pixels of the sub-image as the potential edge pixels when the average SAD value is above a defined threshold value.

11. The multi-function device as claimed in claim 10, wherein the defined threshold value is 19.

12. The multi-function device as claimed in claim 8, wherein the boundary extraction module determines the perimeter boundaries by:

performing a closing operation on each of the multiple documents;

performing hole-filling operation to fill holes with pixel values that represent colors that are similar to the color of background pixels that are in the vicinity of each of the holes; and following the closing and hole filling operations, counting the number of the multiple documents present in the input image.

13. The multi-function device as claimed in claim 8, wherein the segmentation module creates the separate image files by:

extracting individually images for each of the segmented documents using selective segmented mask image technique;

compressing the extracted images of each of the segmented documents; and storing the extracted images in the separate image files on one of a storage device and a memory device.

14. The multi-function device as claimed in claim 8, further comprising a Hough transform module, coupled to the processor, to:
- perform Hough transform on the edges of the multiple documents to determine non-zero value of orientation of individual documents; and
- rotate the individual documents for the non-zero value of the orientation determined by the Hough transform.

15. A non-transitory computer-readable medium comprising instructions executable by a processing resource to:
- receive an input image comprising multiple documents;
- identify potential edge pixels of the multiple documents using a computer implemented sum of absolute difference (SAD) based edge detection technique, wherein the technique comprises:
  - segment each color separation of the input image into equal sized overlapped sub-images for each pixel, and for each sub-image,
  - determine a maximum pixel value for each color separation;
  - compute the SAD value between the maximum pixel value and pixel values in the sub-image for each color separation;
  - determine average SAD value of the SAD values computed in the sub-image for each color separation; and
  - based on the average SAD value, identify the pixels of the sub-image as the potential edge pixels;
- based on the identified potential edge pixels, determine perimeter boundaries surrounding a region of interest corresponding to each of the multiple documents using one or more morphological operations;
- generate an image mask representing the region of interest for each of the multiple documents;
- segment the multiple documents in the input image based on the determined perimeter boundaries and generated image mask representing the region of interest for each of the multiple documents; and
- print separate document files for each of the segmented multiple documents.

16. The non-transitory computer-readable medium as claimed in claim 15 comprising instructions executable by the processing resource to identify the potential edge pixels of the sub-image as the potential edge pixels when the average SAD value is above a defined threshold value.

17. The non-transitory computer-readable medium as claimed in claim 16, wherein the defined threshold value is 19.

18. The non-transitory computer-readable medium as claimed in claim 15 comprising instructions executable by the processing resource to:
- perform closing operation on each of the multiple documents;
- perform hole-filling operation to fill holes with pixel values that represent colors that are similar to the color of background pixels that are in the vicinity of each of the holes; and
- follow closing and hole filling operation, count the number of multiple documents present within the input image.

19. The non-transitory computer-readable medium as claimed in claim 15 comprising instructions executable by the processing resource to:
- extract individually images for each of the multiple segmented documents using selective segmented mask image technique;
- compress the extracted images of each of the multiple segmented documents; and
- store the extracted images in separate image files on one of a storage device and a memory device.

20. The non-transitory computer-readable medium as claimed in claim 15 comprising instructions executable by the processing resource to:
- perform Hough transform on the edges of the multiple documents to determine non-zero value of orientation of individual documents; and
- rotate the individual documents for the non-zero value of the orientation determined by the Hough transform.

* * * * *